(12) United States Patent
Muldoon

(10) Patent No.: US 11,781,477 B2
(45) Date of Patent: Oct. 10, 2023

(54) HYBRID-ELECTRIC SINGLE ENGINE DESCENT FAILURE MANAGEMENT

(71) Applicant: RTX Corporation, Farmington, CT (US)

(72) Inventor: Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/976,326

(22) Filed: Oct. 28, 2022

(65) Prior Publication Data

US 2023/0138442 A1 May 4, 2023

Related U.S. Application Data

(60) Provisional application No. 63/273,458, filed on Oct. 29, 2021.

(51) Int. Cl.
| | |
|---|---|
| *F02C 6/08* | (2006.01) |
| *F02C 7/32* | (2006.01) |
| *B64D 13/06* | (2006.01) |
| *B64D 27/16* | (2006.01) |
| *B64D 27/24* | (2006.01) |
| *B64D 27/02* | (2006.01) |

(52) U.S. Cl.
CPC ............... *F02C 6/08* (2013.01); *B64D 13/06* (2013.01); *B64D 27/16* (2013.01); *B64D 27/24* (2013.01); *F02C 7/32* (2013.01); *B64D 2013/0618* (2013.01); *B64D 2027/026* (2013.01); *F05D 2220/323* (2013.01); *F05D 2220/76* (2013.01)

(58) Field of Classification Search
CPC ...... F02C 6/08; F02C 6/00; F02C 9/42; F02C 7/32; B64D 2013/06; B64D 2013/0603–0696; B64D 2027/026; B64D 27/16; B64D 27/24; F05D 2220/323; F05D 2220/76
See application file for complete search history.

(56) References Cited

U.S. PATENT DOCUMENTS 11,015,523 B2    5/2021  Terwilliger et al.
11,149,642 B2 *  10/2021 Bayraktar ............... F01D 25/24
(Continued)

OTHER PUBLICATIONS

Search Report issued in European Patent Application No. 22204552.8; Application Filing Date Oct. 28, 2022; dated Mar. 16, 2023 (5 pages).

*Primary Examiner* — Todd E Manahan
*Assistant Examiner* — Rodolphe Andre Chabreyrie
(74) *Attorney, Agent, or Firm* — CANTOR COLBURN LLP

(57) ABSTRACT

A hybrid-electric aircraft system is provided and includes first and second hybrid-electric engines, first and second ducting systems fluidly communicative with each other and with the first and second hybrid-electric engines, respectively, and a control system. The control system is operably coupled to each of the first and second hybrid-electric engines and to each of the first and second ducting systems. The control system is configured to run the first hybrid-electric engine normally, to run the second hybrid-electric engine in a lower power mode and to control each of the first and second ducting systems to direct bleed air from the first hybrid-electric engine to the second hybrid-electric engine.

18 Claims, 5 Drawing Sheets

(56) References Cited

U.S. PATENT DOCUMENTS

| | | | | |
|---|---|---|---|---|
| 11,536,153 | B2* | 12/2022 | Morgan | F02C 6/02 |
| 11,542,874 | B2* | 1/2023 | Tamada | F02C 9/42 |
| 2007/0267540 | A1* | 11/2007 | Atkey | B64D 41/00 |
| | | | | 244/58 |
| 2014/0013751 | A1* | 1/2014 | Roggemans | B64D 27/24 |
| | | | | 60/705 |
| 2018/0187604 | A1* | 7/2018 | Poumarede | F02C 9/42 |
| 2019/0368417 | A1* | 12/2019 | Terwilliger | F02C 9/18 |
| 2019/0383220 | A1 | 12/2019 | Mackin | |
| 2020/0056497 | A1 | 2/2020 | Terwilliger et al. | |
| 2021/0025332 | A1* | 1/2021 | Morenko | F02C 9/263 |
| 2021/0025337 | A1* | 1/2021 | Morenko | F02C 9/42 |
| 2021/0054782 | A1* | 2/2021 | Kupratis | F01D 13/003 |
| 2021/0115857 | A1 | 4/2021 | Collopy | |

* cited by examiner

HYBRID-ELECTRIC SINGLE ENGINE DESCENT FAILURE MANAGEMENT

CROSS-REFERENCE TO RELATED APPLICATIONS

This application claims priority to U.S. Provisional Application No. 63/273,458 filed Oct. 29, 2021, the contents of which are hereby incorporated by reference in its entirety.

BACKGROUND

Exemplary embodiments pertain to the art of gas turbine engines, and in particular to aircraft hybrid-electric engines.

An aircraft can selectively power a hybrid-electric engine by providing electric power from various sources. During descent with one engine operating on electric power and the other engine operating with fuel burn, various aspects must be considered such that the engine system operates efficiently, and such that the engine operating on electric power can rapidly resume a fuel-burn mode of operation if and when that is needed.

For example, during single engine descent, thrust matching is performed. For example, 1000 pounds of thrust per engine would be achieved by driving one engine fan electrically to provide 1000 pounds of thrust and by driving the other engine in a fuel-burning mode can generate power for the electrically-operated engine and produce 1000 pounds of thrust.

BRIEF DESCRIPTION

According to an aspect of the disclosure, a hybrid-electric aircraft system is provided and includes first and second hybrid-electric engines, first and second ducting systems fluidly communicative with each other and with the first and second hybrid-electric engines, respectively, and a control system. The control system is operably coupled to each of the first and second hybrid-electric engines and to each of the first and second ducting systems. The control system is configured to run the first hybrid-electric engine normally, to run the second hybrid-electric engine in a lower power mode and to control each of the first and second ducting systems to direct bleed air from the first hybrid-electric engine to the second hybrid-electric engine.

In accordance with additional or alternative embodiments, while running the first hybrid-electric engine normally and while running the second hybrid-electric engine in the lower power mode, the control system is further configured to cease extracting air or electro-mechanical loads from the second hybrid-electric engine and to divert electrical power from the first hybrid-electric engine to the second hybrid-electric engine.

In accordance with additional or alternative embodiments, the control system runs the first hybrid-electric engine normally and runs the second hybrid-electric engine in the lower power mode while simultaneously controlling each of the first and second ducting systems to direct the bleed air from the first hybrid-electric engine to the second hybrid-electric engine.

In accordance with additional or alternative embodiments, the control system runs the first hybrid-electric engine normally and runs the second hybrid-electric engine in the lower power mode during descent.

In accordance with additional or alternative embodiments, each of the first and second hybrid-electric engines includes a gas turbine engine with a combustor, high- and low-pressure compressors and high- and low-pressure turbines and high- and low-spool electric machines to drive operations of the gas turbine engine.

In accordance with additional or alternative embodiments, each of the first and second ducting systems includes an environmental control system (ECS) line, first and second bleed air lines by which the bleed air from the high- and low-pressure compressors of the corresponding one of the first and second hybrid-electric engines is directed to the ECS line and controllable valves arranged along the first and second bleed air lines and between the ECS line and the first and second bleed lines to control flows of the bleed air to the ECS line from the high- and low-pressure compressors of the corresponding one of the first and second hybrid-electric engines.

In accordance with additional or alternative embodiments, a cabin air conditioning system is provided by which the ECS lines of the first and second ducting systems are fluidly communicative.

According to an aspect of the disclosure, a hybrid-electric aircraft system is provided and includes first and second hybrid-electric engines, first and second ducting systems fluidly communicative with each other and with the first and second hybrid-electric engines, respectively, and a control system. The control system is operably coupled to each of the first and second hybrid-electric engines and to each of the first and second ducting systems. The control system is configured to run the first hybrid-electric engine at a minimum descent idle level, to run the second hybrid-electric engine at below the minimum descent idle level and to control each of the first and second ducting systems to direct bleed air from the first hybrid-electric engine to the second hybrid-electric engine.

In accordance with additional or alternative embodiments, while running the first hybrid-electric engine at the minimum descent idle level and while running the second hybrid-electric engine at below the minimum descent idle level, the control system is further configured to cease extracting air or electro-mechanical loads from the second hybrid-electric engine and to divert electrical power from the first hybrid-electric engine to the second hybrid-electric engine.

In accordance with additional or alternative embodiments, the control system runs the first hybrid-electric engine at the minimum descent idle level and runs the second hybrid-electric engine at below the minimum descent idle level while simultaneously controlling each of the first and second ducting systems to direct the bleed air from the first hybrid-electric engine to the second hybrid-electric engine.

In accordance with additional or alternative embodiments, the control system runs the first hybrid-electric engine at the minimum descent idle level and runs the second hybrid-electric engine at below the minimum descent idle level during descent.

In accordance with additional or alternative embodiments, each of the first and second hybrid-electric engines includes a gas turbine engine with a combustor, high- and low-pressure compressors and high- and low-pressure turbines and high- and low-spool electric machines to drive operations of the gas turbine engine.

In accordance with additional or alternative embodiments, each of the first and second ducting systems includes an environmental control system (ECS) line, first and second bleed air lines by which the bleed air from the high- and low-pressure compressors of the corresponding one of the first and second hybrid-electric engines is directed to the ECS line and controllable valves arranged along the first and second bleed air lines and between the ECS line and the first and second bleed lines to control flows of the bleed air to the ECS line from the high- and low-pressure compressors of the corresponding one of the first and second hybrid-electric engines.

In accordance with additional or alternative embodiments, a cabin air conditioning system is provided by which the ECS lines of the first and second ducting systems are fluidly communicative.

According to an aspect of the disclosure, a method of operating a hybrid-electric aircraft system including first and second hybrid-electric engines is provided. The method includes initiating a fuel conservation mode, running the first and second hybrid-electric engines normally and in a low power mode, respectively, and directing bleed air from the first hybrid-electric engine to the second hybrid-electric engine.

In accordance with additional or alternative embodiments, the running of the second hybrid-electric engine includes ceasing extraction of air and electro-mechanical loads from the second hybrid-electric engine.

In accordance with additional or alternative embodiments, the running of the second hybrid-electric engine includes diverting electrical power from the first hybrid-electric engine to the second hybrid-electric engine.

In accordance with additional or alternative embodiments, the initiating is executed during descent.

In accordance with additional or alternative embodiments, the running includes running the first hybrid-electric engine at a minimum descent idle level and running the second hybrid-electric engine at below the minimum descent idle level.

In accordance with additional or alternative embodiments, the running of the first and second hybrid-electric engines normally and in the low power mode, respectively, and the directing of bleed air from the first hybrid-electric engine to the second hybrid-electric engine are simultaneous.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Electric generators and motors have been incorporated into aircraft engines to provide a hybrid-electric engine that produces electric energy for various engine and aircraft support systems. However, primary power production and operation relies on conversion of the high-energy exhaust gas flow into mechanical power. Aircraft control systems for hybrid-electric engines systems have been developed, which allow for selectively powering the hybrid-electric engine by providing electric power from various sources to reduce fuel consumption and improve overall engine efficiencies. During descent with one engine operating on electric power and the other engine operating with fuel burn, various aspects must be considered such that the engine system operates efficiently, and the engine operating on electric power can rapidly resume a fuel-burn mode of operation.

Figure 1:
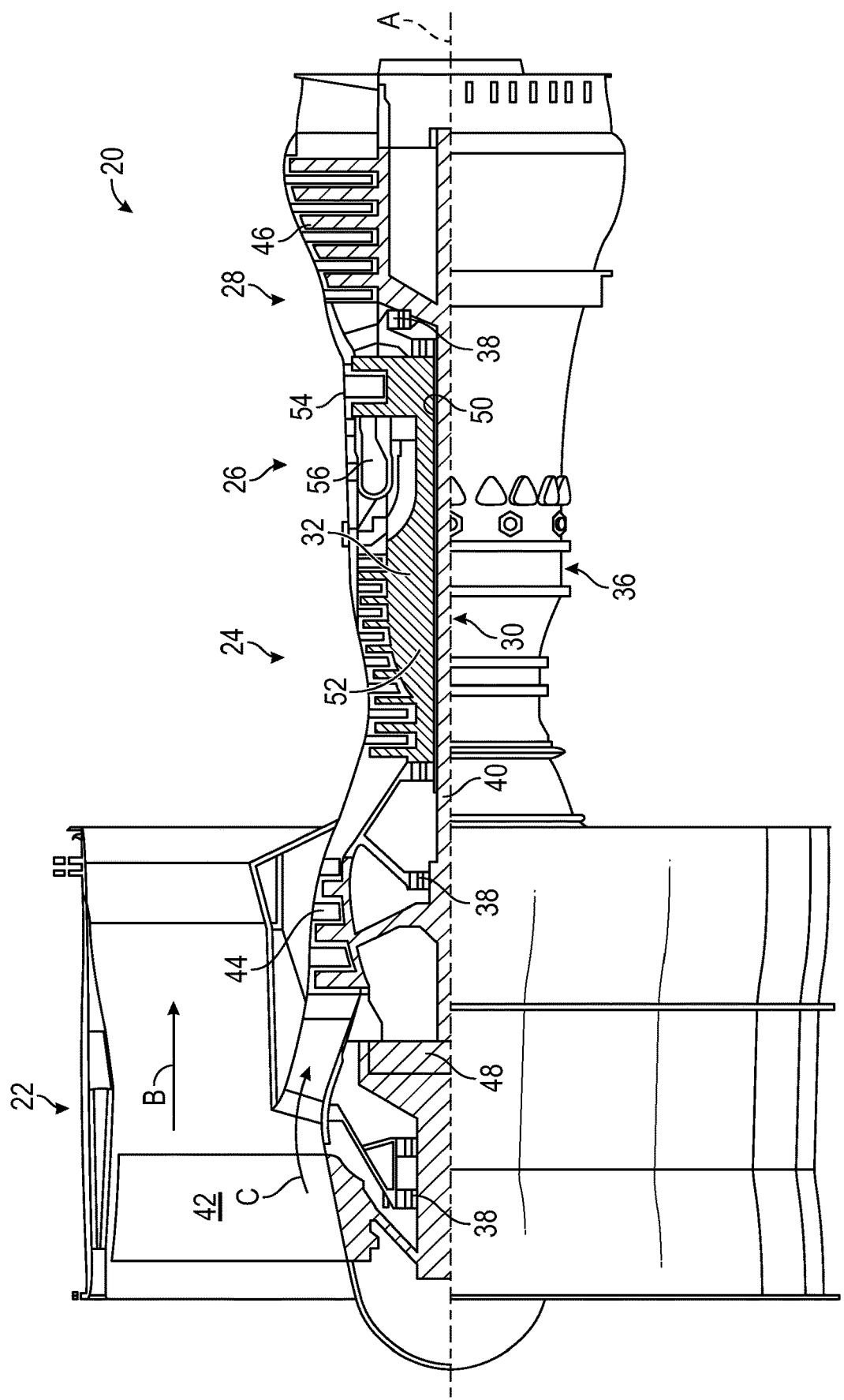
FIG. 1 a partial cross-sectional illustration of a gas turbine engine according to a non-limiting embodiment.

With reference now to FIG. 1, a gas turbine engine 20 is illustrated according to a non-limiting embodiment. The gas turbine engine 20 is disclosed herein as a multi-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with multi-spool turbofans as the teachings may be applied to other types of turbine engines including, for example, three-spool architectures.

The exemplary engine 20 generally includes one or more low-spool generator machines 30, referred to herein as a "low-spool" 30 and a high-spool generator machine 32, referred to herein as a "high-spool 32" mounted for rotation about an engine central longitudinal axis (A) relative to an engine static structure 36 via several bearing systems 38. It should be understood that various bearing systems 38 at various locations may alternatively or additionally be provided, and the location of bearing systems 38 may be varied as appropriate to the application.

The low-spool 30 generally includes an inner shaft 40 that interconnects a fan 42, a low-pressure compressor 44 and a low-pressure turbine 46. The inner shaft 40 is connected to the fan 42 through a speed change mechanism, which in exemplary gas turbine engine 20 is illustrated as a geared architecture 48 to drive the fan 42 at a lower speed than the low-spool 30. The high-spool 32 includes an outer shaft 50 that interconnects a high-pressure compressor 52 and high-pressure turbine 54. A combustor 56 is arranged in exemplary gas turbine 20 between the high-pressure compressor 52 and the high-pressure turbine 54. An engine static structure 36 is arranged generally between the high-pressure turbine 54 and the low-pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The turbines 46, 54 rotationally drive a respective low-spool 30 and high-spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption, also known as "bucket cruise. Thrust Specific Fuel Consumption (TSFC") is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction. In one or more non-limiting embodiments, the temperature correction can be determined according to the relationship of [(Tram ° R)/(518.7° R)]0.5, where Tram is a ram air temperature. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
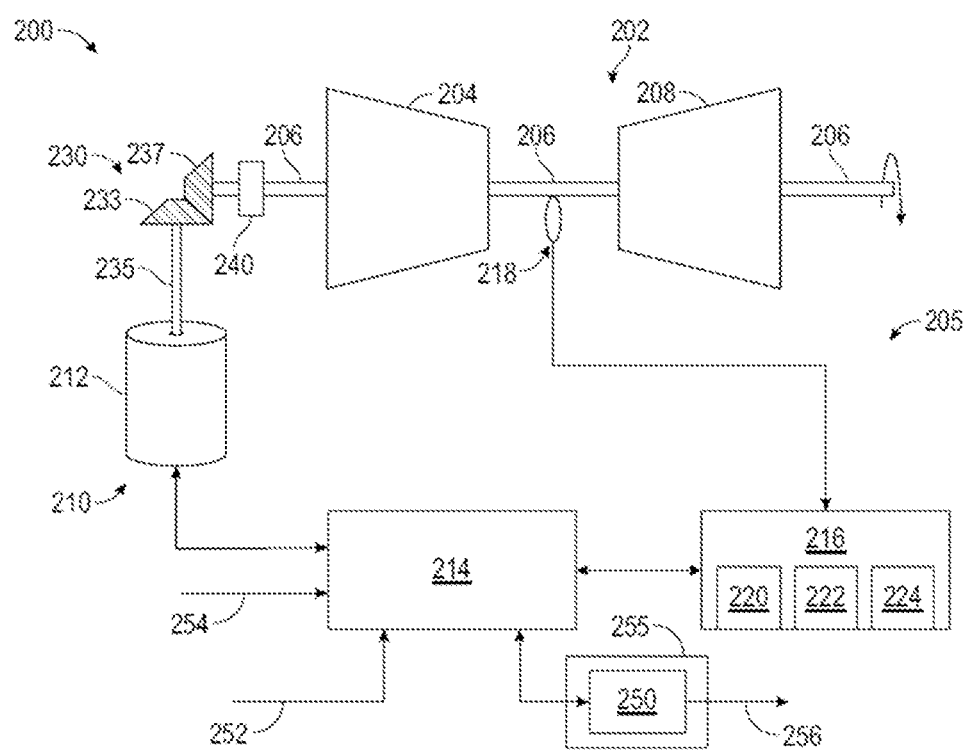
FIG. 2 is a schematic diagram of a hybrid-electric gas turbine engine system including a power management system in accordance with a non-limiting embodiment of the disclosure.

FIG. 2 illustrates portions of a hybrid-electric gas turbine engine system 200 according to a non-limiting embodiment. The hybrid-electric gas turbine engine system 200 includes a rotor system 202 and a power management system 205. The rotor system 202 includes at least one compressor section 204 and at least one turbine section 208 operably coupled to a shaft 206. The rotor system 202 can include one or more spools of the gas turbine engine 20 of FIG. 1, such as one or more low-spools 30 and/or one or more high-spools 32. For example, employing one or more low-spools 30, one or more compressor sections 204 can be equivalent to the low-pressure compressor 44, the shaft 206 can be equivalent to the inner shaft 40, and the at least one turbine section 208 can be equivalent to the low-pressure turbine 46 of FIG. 1. When embodied as the high-spool 32, one or more compressor sections 204 can be equivalent to the high-pressure compressor 52, the shaft 206 can be equivalent to the outer shaft 50, and the at least one turbine section 208 can be equivalent to the high-pressure turbine 54 of FIG. 1.

In the example of FIG. 2, a battery charging system 210 is operably coupled to the rotor system 202. The battery charging system 210 includes a generator 212 operably coupled to the shaft 206. In the example of FIG. 2, a geared interface 230 operably couples the generator 212 to the shaft 206. The geared interface 230 can include, for instance, an auxiliary gear 233 coupled to an auxiliary shaft 235 driven by the generator 212. The geared interface 230 can also include a rotor gear 237 coupled to the shaft 206. The auxiliary gear 233 and the rotor gear 237 can each be beveled gears. The auxiliary shaft 235 can be a tower shaft that enables the generator 212 to be separated at a greater distance from the rotor system 202 than direct coupling to the shaft 206 would provide. Further separation of the generator 212 from the rotor system 202 can improve accessibility to the generator 212 for servicing and may reduce heating effects of the rotor system 202 on the generator 212 (e.g., due to fuel combustion). A disconnect 240, such as a clutch, can be positioned between the generator 212 and a portion of the shaft 206 such that the generator 212 can be selectively engaged and disengaged to rotate with rotation of the shaft 206. In alternate embodiments, the generator 212 is operably coupled to the shaft 206 absent the geared interface 230 (e.g., direct coupling).

The battery charging system 210 also includes a power converter system 214 in signal communication with the generator 212 and a battery system 255. In some embodiments, the generator 212 is a motor-generator configurable in a generator mode to charge a rechargeable battery included in the battery system, and in a motor mode to provide supplemental rotation force to the rotor system 202 of gas turbine engine 20 of FIG. 1. The power converter system 214 includes converter electronics configured to condition current from the generator 212 such that the battery included in the battery system 255 can be repeatedly recharged. The converter electronics include, but are not limited to, analog current (AC) distribution circuitry, bi-directional power electronic circuitry, direct current (DC) power distribution electronics, AC-to-DC converter electronics, DC-to-DC converter electronics, rectifier circuits, a battery system, and an auxiliary power unit (APU)/supplemental power unit (SPU).

The generator 212 can include conventional generator/motor components, such as a rotor and stator, including a plurality of windings and/or permanent magnets. The converter electronics 214 can also include conventional current control electronics, such as filters, switching components, rectifiers, inverters, voltage converters, and the like. The generator 212 can perform as a variable frequency generator in a generator mode due to speed fluctuations of rotation of the shaft 206, which may be primarily driven by the at least one turbine section 208. Alternatively, a frequency normalizing component can interface with the generator 212 to produce a constant frequency output (e.g., through the converter electronics 214 or as a mechanical interface between the generator 212 and the shaft 206). In some embodiments, the generator 212 may be operable as a starter motor to partially or completely power rotation of the shaft 206 in a starting mode of operation (e.g., to start the gas turbine engine 20 of FIG. 1) and/or can provide supplemental power to the shaft 206 during various flight phases of the hybrid-electric aircraft 200. Other uses and functions for the generator 212 are contemplated.

The converter electronics 214 can control charging of the battery system 255 responsive to a controller 216. The controller 216 can enable a flow of a charging current from the generator 212 or a power input 252 to charge the battery included in the battery system 255 as regulated and conditioned through the converter electronics 214. The power input 252 can be an external input, such as power received through a plug interface while the hybrid-electric aircraft 200 is on the ground at a ground-based power source, e.g., at a gate or service location. In some embodiments, the converter electronics 214 may receive electric current from an auxiliary power input 254 to provide a supplemental or alternative power source for charging the battery included in the battery system 255. For instance, the auxiliary power input 254 may receive electric current from an auxiliary power unit (not depicted) or another instance of the gas turbine engine 20 on the hybrid-electric aircraft 200. The charge stored in the battery system 255 can provide an electric current for a propulsion system use 256, which may include powering one or more electric motors of the hybrid-electric aircraft 200 during various operational states and/or providing power to the generator 212 when operating in a motor mode, for instance, to assist in driving rotation of shaft 206. The propulsion system uses 256 can be part of the gas turbine engine 20 that includes the rotor system 202 or another aircraft system, such as another instance of the gas turbine engine 20 on the hybrid-electric aircraft 200.

In embodiments, the controller 216 of the battery charging system 210 can monitor one or more rotor system sensors 218 while the rotor system 202 is rotating. The rotor system sensors 218 can be any type or combination of sensors operable to measure aspects of the motion of the rotor system 202. For example, the rotor system sensors 218 can include one or more accelerometers, speed sensors, torque sensors, and the like. The rotor system sensors 218 can include existing sensors used for controlling the gas turbine engine 20. The controller 216 can control a charging of the battery system 255, for instance, by selecting the source of electric current received through the converter electronics 214. Data collected from the rotor system sensors 218 can be used to determine an operational status of a gas turbine engine 20 of FIG. 2. Alternatively, the operational status of a gas turbine engine 20 can be received as a signal or message from an alternate source, such as an engine system or aircraft communication bus. The controller 216 may also control other system aspects, such as controlling operation of the gas turbine engine 20 of FIG. 1. For example, the controller 216 can be integrally formed or otherwise in communication with a full authority digital engine control (FADEC) of the gas turbine engine 20. The rotor system sensors 218 need not be directly coupled to the controller 216, as sensor data or sensor-derived data can be observed or determined by another control (e.g., a FADEC) and provided to the controller 216.

In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the power converter system 214 and/or other systems (not depicted).

Figure 3:
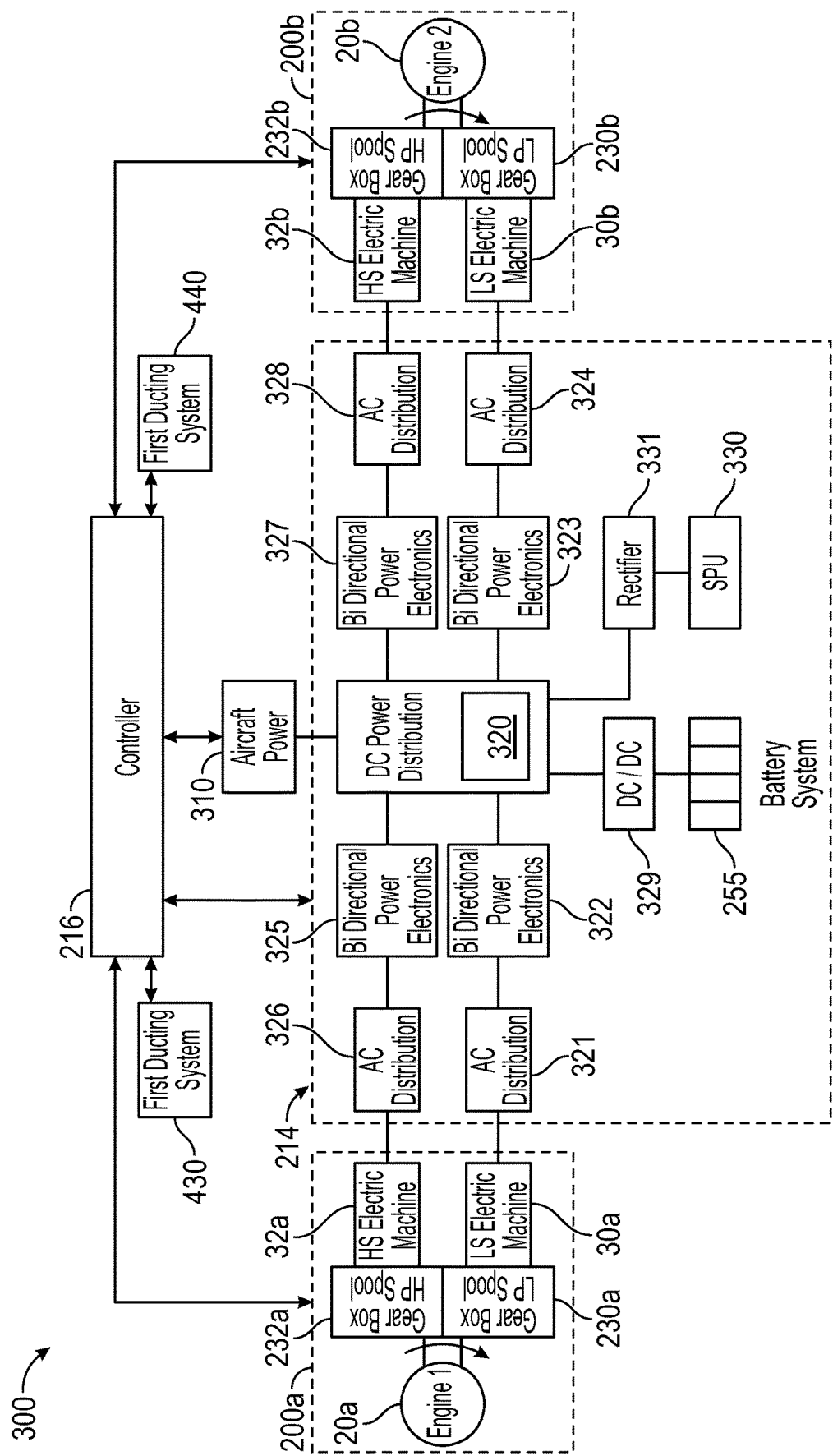
FIG. 3 is a block diagram of a hybrid-electric engine management system according to a non-limiting embodiment.

Turning now to FIG. 3, a hybrid-electric engine management system 300 is illustrated. The hybrid-electric engine management system 300 includes a first hybrid-electric engine system 200a, a second hybrid-electric engine syst 200b, a power converter system 214, an aircraft power system 310, and an aircraft controller 216.

The first hybrid-electric engine system 200a includes a first gas turbine engine 20a, a low-spool electric machine 30a, an optional second low-spool electric machine (not shown), and a high-spool electric machine 32a. The high-spool electric machine 32a can be coupled to the first hybrid-electric engine system 20a via a gearing interface 232a. Similarly, the electric machine 30a is coupled to the first gas turbine engine 20a via a geared interface 230a.

The second hybrid-electric engine system 200b includes a second gas turbine engine 20b, a low-spool electric machine 30b, an optional second low-spool electric machine (not shown), and a high-spool electric machine 32b. The high-spool electric machine 32b is coupled to the second hybrid-electric engine system 20b via a gearing interface 232b. Similarly, the low-spool electric machine 30b can be coupled to the second gas turbine engine 20b via a geared interface 230b.

The power converter system 214 includes a direct current (DC) power distribution bus 320. The DC power distribution bus 320 includes multiple contactors and switches by which the DC power distribution bus 320 can connect to the low-spool electric machine 30a via bi-directional power electronics 321 and an alternating current (AC) distribution bus 322, to the low-spool electric machine 30b via bi-directional power electronics 323 and an AC distribution bus 324, to the high-spool electric machine 32a via bi-directional power electronics 325 and an alternating current (AC) bus 326 and to the high-spool electric machine 32b via bi-directional power electronics 327 and an AC distribution bus 328. In addition, the DC power distribution bus 320 also includes multiple contactors and switches by which the DC power distribution bus 320 can connect to the battery system 255 via a DC/DC converter 329 and to supplemental power unit (SPU) 330 via rectifier 331.

Thus, the power converter system 214 includes converter electronics configured to provide power to the aircraft power system 310 and/or the battery system 255. For example, the power converter system 214 can deliver power to the aircraft power system 310, which can be utilized to power the aircraft galley, cabin lighting system, cabin HVAC systems, etc. The power converter system 214 can also deliver power to the battery system 255 to charge one or more rechargeable batteries. The power converter system 214 can also deliver power from the battery system 255 to the aircraft power system 310 and/or to the first and or second hybrid engine system 200a and 200b.

The controller 216 is in signal communication with the first hybrid-electric engine system 200a, the second hybrid-electric engine system 200b, the power converter system 214 and the aircraft power system 310. In one or more non-limiting embodiments, the controller 216 can selectively control various operations of the first and second hybrid-electric engine systems 200a and 200b such as, for example, selectively activating and deactivating the first and/or second engines 20a and 20b. The controller 216 can also selectively activate and deactivate the low-spool electric machine 30a and the high-spool electric machine 32a included in the first hybrid-electric engine system 200a and/or the low-spool electric machine 30b and the high-spool electric machine 32b included in the second hybrid-electric engine systems 200b. In one or more non-limiting embodiments, the controller can selectively activate the low-spool electric machines and the high-spool electric machine independently from one another. In one or more non-limiting embodiments, the controller 216 can selectively activate or deactivate one of the low-spool electric machines (e.g., low-spool electric machine 31a) included in a given hybrid-electric engine systems with respect to other low-spool electric machines (e.g., low-spool electric machine 30a) included in a given hybrid-electric engine system (e.g., hybrid-electric engine system 200a).

With continued reference to FIG. 3, to reduce fuel consumption and improve overall operating efficiency during descent of the aircraft, the aircraft controller 216 can deactivate the second gas turbine engine 20b while maintaining activation of the first gas turbine engine 20a. Accordingly, power generated by the low-spool electric machine 30a included in the first hybrid-electric engine system 200a is conditioned by the power converter system 214, and delivered to the low-spool electric machine 30b included in the second hybrid-electric engine system 200b. Alternatively, to reduce fuel consumption and improve overall operating efficiency during descent of the aircraft but without deactivating the second gas turbine engine 20b, the aircraft controller 216 can control an operation of the second gas turbine engine 20b to operate at low power levels and with minimal fuel burn while maintaining activation of the first gas turbine engine 20a. Maintaining the second gas turbine engine 20b in a lit condition will increase reliability, for instance, if there is an electrical fault or if descent is aborted.

A problem with operating the second gas turbine engine 20b at the low power levels and with minimal fuel burn is that such operational limits can lead to compressor instability and/or combustor blow out.

Figure 4:
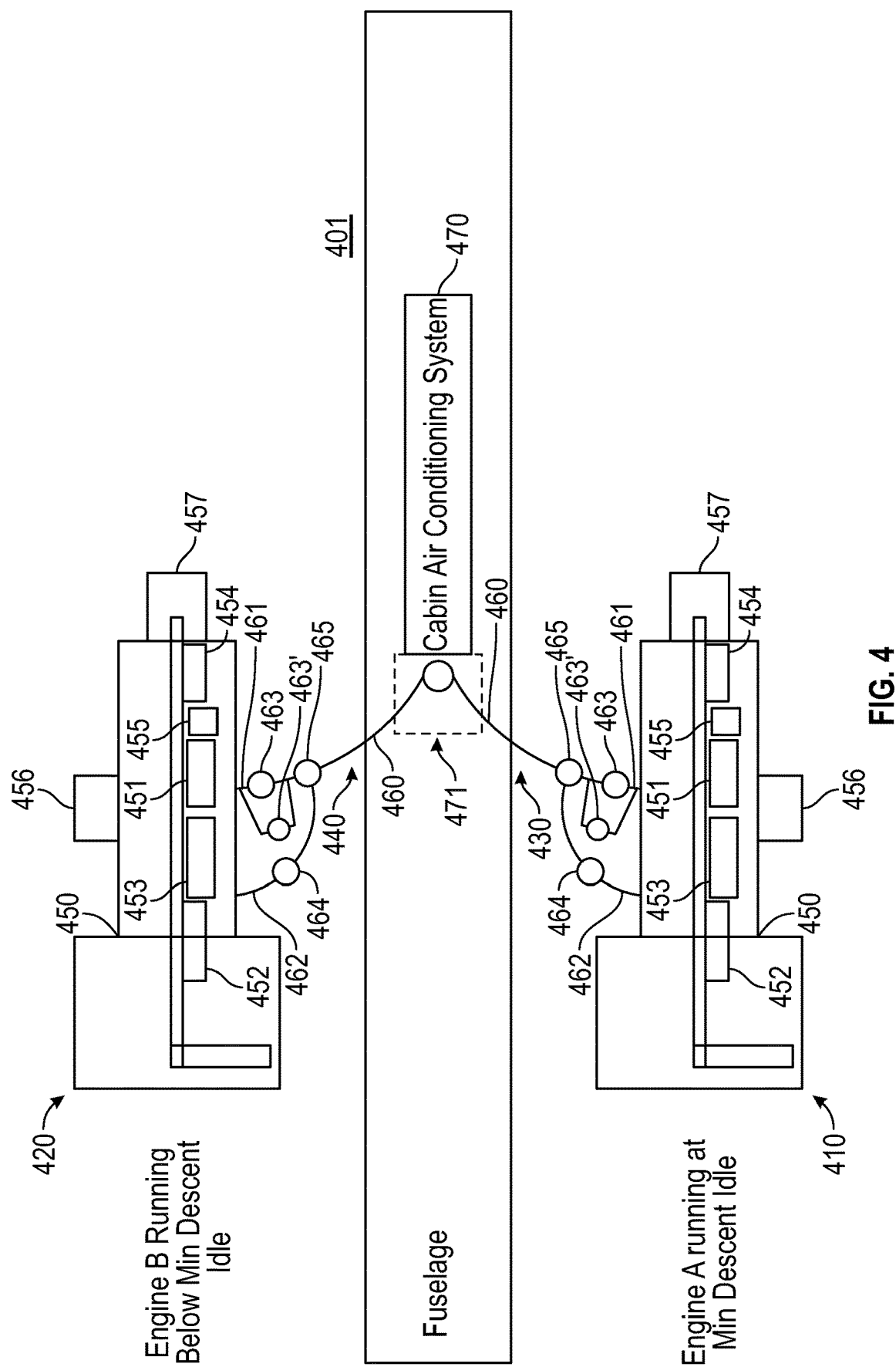
FIG. 4 is a block diagram of bleed air ducts for use with a hybrid-electric engine management system according to a non-limiting embodiment.

Thus, with continued reference to FIG. 3 and with additional reference to FIG. 4, a hybrid-electric aircraft system 401 is provided to allow the second gas turbine engine 20b to be operated at the low power levels and with minimal fuel burn without risking compressor instability and/or combustor blow out during certain flight envelopes such as descent for example. The hybrid-electric aircraft system 401 includes a first hybrid-electric engine 410, a second hybrid-electric engine 420, a first ducting system 430, which is fluidly communicative with the first hybrid-electric engine 420, a second ducting system 440, which is fluidly communicative with the first ducting system 430 and with the second hybrid-electric engine 420 and a control system (i.e., the controller 216 of FIG. 3).

The control system is operably coupled to each of the first and second hybrid-electric engines 410 and 420 and to each of the first and second ducting systems 430 and 440. With this configuration, the control system is configured to run the first hybrid-electric engine 410 normally or at a minimum descent idle level, to run the second hybrid-electric engine 420 in a low power mode or below the minimum descent idle level and to control each of the first and second ducting systems 430 and 440 to direct bleed air from the first hybrid-electric engine 410 to the second hybrid-electric engine 420.

In accordance with embodiments, the control system is configured such that, while running the first hybrid-electric engine 410 at the minimum descent idle level and while running the second hybrid-electric engine 420 at below the minimum descent idle level, the control system ceases extracting air or electro-mechanical loads from the second hybrid-electric engine 420 and diverts electrical power from the first hybrid-electric engine 410 to the second hybrid-electric engine 420. In accordance with further embodiments, the control system runs the first hybrid-electric engine 410 at the minimum descent idle level and runs the second hybrid-electric engine 420 at below the minimum descent idle level while simultaneously controlling each of the first and second ducting systems 430 and 440 to direct the bleed air from the first hybrid-electric engine 410 to the second hybrid-electric engine 420.

As described above with respect to FIG. 2 and as shown in FIG. 4, each of the first and second hybrid-electric engines 410 and 420 includes a gas turbine engine 450 with a combustor 451, high- and low-pressure compressors 452 and 453 and high- and low-pressure turbines 454 and 455 as well as high- and low-spool electric machines 456 and 457 to drive operations of the gas turbine engine 450. Each of the first and second ducting systems 430 and 440 includes an environmental control system (ECS) line 460, a first bleed air line 461 by which the bleed air from the high-pressure compressor 452 is directed to the ECS line 460, a second bleed air line 462 by which the bleed air from the low-pressure compressor 453 is directed to the ECS line 460 and controllable valves 463, 464 and 465. The controllable valve 463 is arranged along the first bleed air line 461 to control flows of bleed air through the first bleed air line 461 and can be provided as a check valve. The controllable valve 464 is arranged along the second bleed air line 462 to control flows of bleed air through the second bleed air line 462 and can be provided as a check valve. The controllable valve 465 can be disposed at an intersection of the ECS line 460 with the first and second bleed air lines 461 and 462 to control flows of the bleed air to the ECS line 460 and can be provided as a shut-off valve. A cabin air conditioning system 470 with a central valve 471 can be provided within an aircraft fuselage to fluidly couple the ECS lines 460 of each of the first and second ducting systems 430 and 440.

In accordance with embodiments, at least one or more additional bypass valves 463' can be provided to form a bypass around corresponding ones of the controllable valves 463. In these or other cases, one of the controllable valves 463 can be provided as a high-capacity or a high-throughput valve and can be closed. Meanwhile, the corresponding bypass valve 463' can be provided as a low-capacity or low-throughput valve and can opened to permit a relatively small amount of bleed air to proceed to the corresponding fuel nozzles. This relatively small amount of bleed air can be useful in atomizing fuel and improving performance.

When the control system runs the first hybrid-electric engine 410 at the minimum descent idle level and runs the second hybrid-electric engine 420 below the minimum descent idle level, the control system can open the controllable valves 463 and 465 of the first ducting system 430, the central valve 471 and the controllable valves 463 and 465 of the second ducting system 440. This will direct bleed air from the high-pressure compressor 453 of the first hybrid-electric engine 410 to the combustor 451 of the second hybrid-electric engine 420. In this way, even if fuel is provided to the combustor 451 of the second hybrid-electric engine 420 at a very low rate, the burner(s) of the second hybrid-electric engine 420 can remain lit.

In accordance with additional embodiments, it is to be understood that additional auxiliary air can be provided to the combustor 451 of the second hybrid-electric engine 420 along with the bleed air as described above. Such auxiliary air can be piped in from various sources, such as the NSE/SPE or from an accessory compressor.

Figure 5:
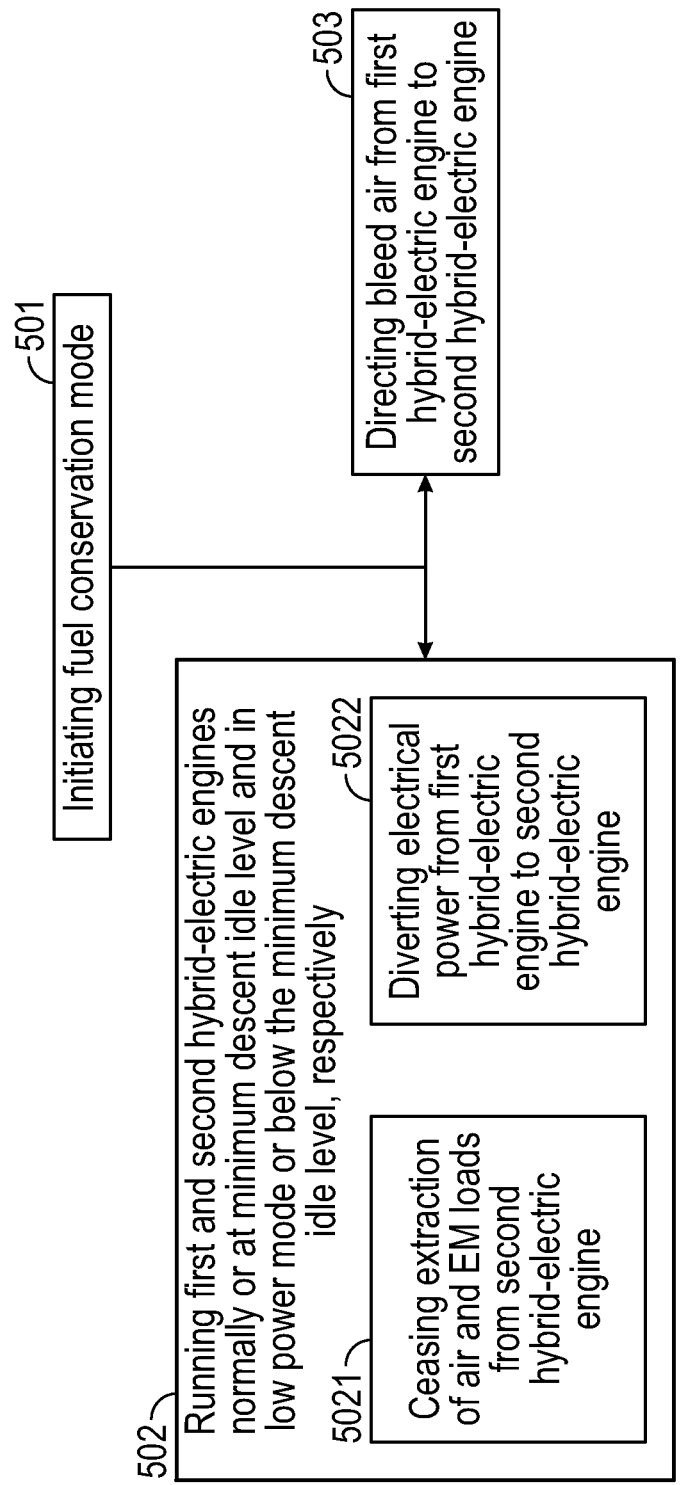
FIG. 5 is a flow diagram illustrating a method of operating a hybrid-electric aircraft system according to embodiments.

With reference to FIG. 5, a method of operating a hybrid-electric aircraft system that includes first and second hybrid-electric engines as described above is provided. The method includes initiating a fuel conservation mode (501) during descent, for example, and running the first and second hybrid-electric engines normally or at a minimum descent idle level and in a low power mode or below the minimum descent idle level, respectively (502). The running of the first and second hybrid-electric engines normally and in the low power mode, respectively, of operation 502 can include ceasing extraction of air and electro-mechanical loads from the second hybrid-electric engine (5021) and diverting electrical power from the first hybrid-electric engine to the second hybrid-electric engine (5022). The method can further include directing bleed air from the first hybrid-electric engine to the second hybrid-electric engine (503) simultaneously with the running of the first and second hybrid-electric engines normally and in the low power mode, respectively, of operation 502.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid-electric aircraft system, comprising:
    first and second hybrid-electric engines;
    first and second ducting systems fluidly communicative with each other and with the first and second hybrid-electric engines, respectively; and
    a control system operably coupled to each of the first and second hybrid-electric engines and to each of the first and second ducting systems,
    wherein:
        the control system runs the first hybrid-electric engine normally and runs the second hybrid-electric engine in a lower power mode during descent, and
        the control system is configured to control each of the first and second ducting systems to direct bleed air from the first hybrid-electric engine to the second hybrid-electric engine.

2. The hybrid-electric aircraft system according to claim 1, wherein, while running the first hybrid-electric engine normally and while running the second hybrid-electric engine in the lower power mode, the control system is further configured to cease extracting air or electro-mechanical loads from the second hybrid-electric engine and to divert electrical power from the first hybrid-electric engine to the second hybrid-electric engine.

3. The hybrid-electric aircraft system according to claim 1, wherein the control system runs the first hybrid-electric engine normally and runs the second hybrid-electric engine in the lower power mode while simultaneously controlling each of the first and second ducting systems to direct the bleed air from the first hybrid-electric engine to the second hybrid-electric engine.

4. The hybrid-electric aircraft system according to claim 1, wherein each of the first and second hybrid-electric engines comprises:
    a gas turbine engine with a combustor, high- and low-pressure compressors and high- and low-pressure turbines; and
    high- and low-spool electric machines to drive operations of the gas turbine engine.

5. The hybrid-electric aircraft system according to claim 4, wherein each of the first and second ducting systems comprises:
    an environmental control system (ECS) line;
    first and second bleed air lines by which the bleed air from the high- and low-pressure compressors of the corresponding one of the first and second hybrid-electric engines is directed to the ECS line; and
    controllable valves arranged along the first and second bleed air lines and between the ECS line and the first and second bleed lines to control flows of the bleed air to the ECS line from the high- and low-pressure compressors of the corresponding one of the first and second hybrid-electric engines.

6. The hybrid-electric aircraft system according to claim 5, further comprising a cabin air conditioning system by which each of the ECS lines of the first and second ducting systems are fluidly communicative.

7. A hybrid-electric aircraft system, comprising:
    first and second hybrid-electric engines;
    first and second ducting systems fluidly communicative with each other and with the first and second hybrid-electric engines, respectively; and
    a control system operably coupled to each of the first and second hybrid-electric engines and to each of the first and second ducting systems,
    the control system being configured to run the first hybrid-electric engine at a minimum descent idle level, to run the second hybrid-electric engine at below the minimum descent idle level and to control each of the first and second ducting systems to direct bleed air from the first hybrid-electric engine to the second hybrid-electric engine.

8. The hybrid-electric aircraft system according to claim 7, wherein, while running the first hybrid-electric engine at the minimum descent idle level and while running the second hybrid-electric engine at below the minimum descent idle level, the control system is further configured to cease extracting air or electro-mechanical loads from the second hybrid-electric engine and to divert electrical power from the first hybrid-electric engine to the second hybrid-electric engine.

9. The hybrid-electric aircraft system according to claim 7, wherein the control system runs the first hybrid-electric engine at the minimum descent idle level and runs the second hybrid-electric engine at below the minimum descent idle level while simultaneously controlling each of the first and second ducting systems to direct the bleed air from the first hybrid-electric engine to the second hybrid-electric engine.

10. The hybrid-electric aircraft system according to claim 7, wherein the control system runs the first hybrid-electric engine at the minimum descent idle level and runs the second hybrid-electric engine at below the minimum descent idle level during descent.

11. The hybrid-electric aircraft system according to claim 7, wherein each of the first and second hybrid-electric engines comprises:
  a gas turbine engine with a combustor, high- and low-pressure compressors and high- and low-pressure turbines; and
  high- and low-spool electric machines to drive operations of the gas turbine engine.

12. The hybrid-electric aircraft system according to claim 11, wherein each of the first and second ducting systems comprises:
  an environmental control system (ECS) line;
  first and second bleed air lines by which the bleed air from the high- and low-pressure compressors of the corresponding one of the first and second hybrid-electric engines is directed to the ECS line; and
  controllable valves arranged along the first and second bleed air lines and between the ECS line and the first and second bleed lines to control flows of the bleed air to the ECS line from the high- and low-pressure compressors of the corresponding one of the first and second hybrid-electric engines.

13. The hybrid-electric aircraft system according to claim 12, further comprising a cabin air conditioning system by which each of the ECS lines of the first and second ducting systems are fluidly communicative.

14. A method of operating a hybrid-electric aircraft system comprising first and second hybrid-electric engines, the method comprising:
  initiating a fuel conservation mode during descent;
  running the first and second hybrid-electric engines normally and in a low power mode, respectively; and
  directing bleed air from the first hybrid-electric engine to the second hybrid-electric engine.

15. The method according to claim 14, wherein the running of the second hybrid-electric engine comprises ceasing extraction of air and electro-mechanical loads from the second hybrid-electric engine.

16. The method according to claim 14, wherein the running of the second hybrid-electric engine comprises diverting electrical power from the first hybrid-electric engine to the second hybrid-electric engine.

17. The method according to claim 14, wherein the running comprises:
  running the first hybrid-electric engine at a minimum descent idle level; and
  running the second hybrid-electric engine at below the minimum descent idle level.

18. The method according to claim 14, wherein the running of the first and second hybrid-electric engines normally and in the low power mode, respectively, and the directing of bleed air from the first hybrid-electric engine to the second hybrid-electric engine are simultaneous.

* * * * *